Sept. 8, 1942.        W. A. WITHAM        2,295,148
TOOL FOR FINISHING GEARS
Filed Jan. 28, 1936        4 Sheets-Sheet 1

Inventor
W. A. Witham
By
B. E. Schlesinger
Attorney

Sept. 8, 1942.  W. A. WITHAM  2,295,148
TOOL FOR FINISHING GEARS
Filed Jan. 28, 1936  4 Sheets-Sheet 2

Inventor
W. A. Witham
By
Attorney

Sept. 8, 1942. W. A. WITHAM 2,295,148
TOOL FOR FINISHING GEARS
Filed Jan. 28, 1936 4 Sheets-Sheet 3

Inventor
W.A.Witham
By
B.F.Schlesinger
Attorney

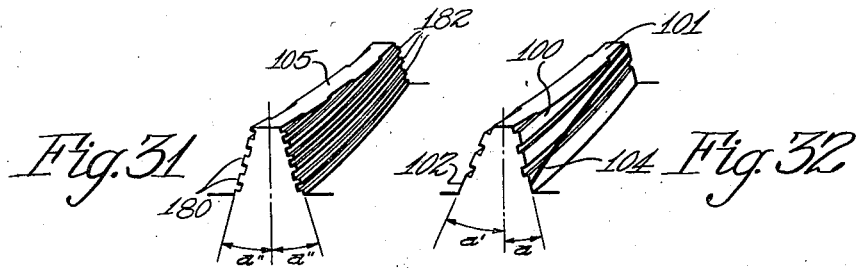
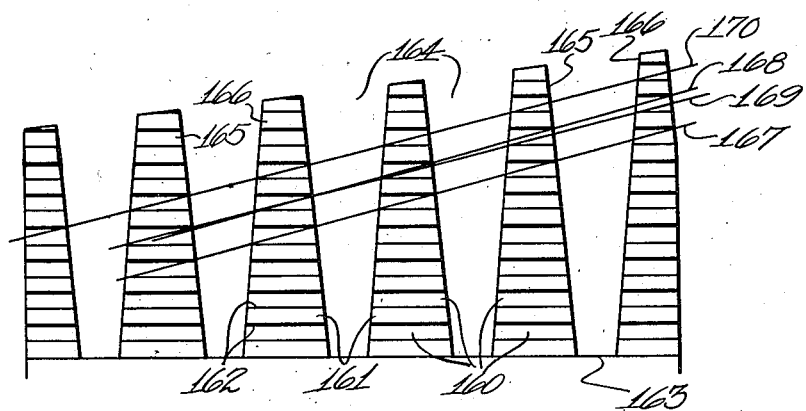
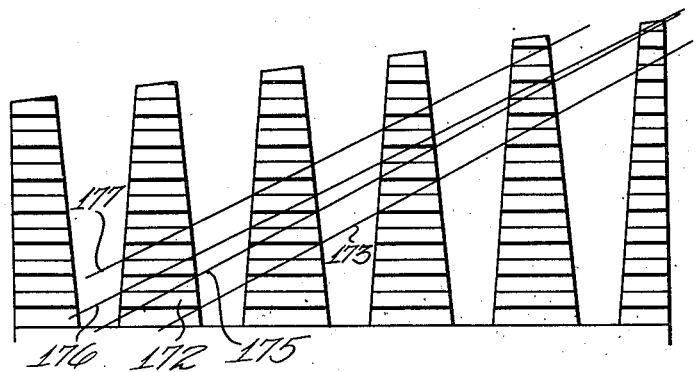

Patented Sept. 8, 1942

2,295,148

UNITED STATES PATENT OFFICE 2,295,148

TOOL FOR FINISHING GEARS

Winfred A. Witham, Rochester, N. Y., assignor to Gleason Works, Rochester, N. Y., a corporation of New York Application January 28, 1936, Serial No. 61,237

10 Claims. (Cl. 29—103)

The present invention relates to tools for and to methods of finishing gears and particularly to tools and processes for shaving or burnishing spiral bevel and hypoid gears.

One object of the invention is to provide a process for shaving gears and particularly bevel gears which will not depend upon or require relative lengthwise sliding between the tooth surfaces of the gear and the cutting edges of the shaving tool to effect the shaving action.

A further object of the invention is to provide a process for shaving spur, bevel and hypoid gears in which the shaving gear or tool and the gear to be shaved may be rotated together on relatively fixed centers.

Another object of the invention is to provide a process for shaving gears which can be performed on apparatus of a relatively simple type such as, for instance, is now commonly used for the testing or burnishing of gears.

Another object of the invention is to provide a more efficient form of shaving tool for all types of gears but particularly for bevel and hypoid gears.

Still another object of the invention is to provide a form of burnishing tool for spiral bevel and hypoid gears which will have much longer life than the burnishing tools heretofore used.

A further object of the invention is to provide a tool for shaving bevel and hypoid gears which may very closely approximate the form of a mate of the gear to be shaved and eliminate the costly development of special forms of tools heretofore required.

A still further object of the invention is to provide a shaving tool which can be ground and sharpened on existing gear grinding machinery.

Another object of the invention is to provide a tool for shaving bevel and hypoid gears which will have equally effective cutting action on both sides of its teeth.

Other objects of the invention will be apparent hereinafter from the specification and from the recital of the appended claims. The present application covers the novel finishing tool of the present invention. The new gear finishing method is covered by my copending application, Serial No. 360,445, filed October 9, 1940.

Efforts to shave spiral bevel gears have heretofore been based upon the assumption that it is necessary to have some relative lengthwise sliding action between the tooth surfaces of the gear being shaved and the cutting edges of the shaving tool in order to have the cutting edges of the tool take shaving cuts and for this reason it has further been assumed that the cutting edges of the shaving tool should extend up and down the profiles of the teeth of the tool in a direction approximately at right angles to the direction of relative sliding. The theory of the necessity for relative sliding action has found support from experience in the shaving of spur gears, for in the spur gear field, relative sliding motion is employed to effect the shaving action in such processes as have found commercial use.

For these reasons, tools for shaving spiral bevel gears have heretofore been made of hypoid gear form and have been generated to mesh in offset relation with the gear to be shaved so that when tool and gear were rotated in mesh, the relative sliding action would be obtained between tool and gear which is characteristic of mesh of a pair of hypoid gears. The production of a hypoid gear conjugate to a given spiral bevel gear is, however, a complicated kinematical problem and long processes of development have been required to produce satisfactory forms of hypoid shaving tools. As a result, the shaving of spiral bevel gears by such processes as have heretofore been proposed has not reached a commercial stage.

With the process of the present invention, it is possible to shave a spiral bevel gear with a tool of spiral bevel gear form and the supposition that relative lengthwise sliding of the tooth surfaces of gear and tool is required to effect shaving action has been disproved. Further, the tool used may have cutting edges which extend longitudinally of its teeth.

It is known that many years ago, efforts were made to finish cut straight bevel gears with a tool of straight bevel gear form having file-like cutting edges extending longitudinally of its teeth. This form of tool, however, was not practical and the process did not prove successful. The cutting edges of the tool were not properly inclined to the lines of contact between the teeth of the tool and the tooth surfaces of the gear to be cut and the cutting action was very poor. There was no means for controlling the mesh of the teeth of the tool and of the gear being cut. Moreover, the tool gear with file-like cutting edges only dulled quickly and was not practical to re-sharpen.

The process of the present invention and the form of tool employed therein are predicated upon the theory that to achieve successful shaving, without relative sliding between the shaving tool and the gear to be shaved, the direction of the cutting edges of the shaving tool should be related to the direction of the lines of contact between the teeth of the shaving tool and the tooth surfaces of the gear to be shaved and that to achieve the shearing cut required to produce efficient, smooth cutting action, it is necessary to incline the cutting edges of the shaving tool properly to these lines of contact.

Further, with the present invention, the shaving tool is in the form of a gear whose cutting edges are formed as a result of longitudinally grooving its tooth surfaces. The cutting edges of the tool lie in the lands between the grooves and since these lands lie in the original tooth surface of the gear, the lands may be ground back to re-sharpen the tool by grinding the tool upon a standard gear grinder. In the preferred form of the invention, the tools are made from gears which are of straight profile, that is, from so-called non-generated gears. The whole profile of a tooth of such a gear can be ground at once and hence the re-sharpening of such a tool is a simple and fast operation.

For shaving a spiral bevel pinion, the tool is preferably made from a non-generated spiral bevel gear conjugate to the pinion and the cutting edges are formed in the tool by grooving the sides of its teeth with grooves which extend parallel to or substantially parallel to the root surface of its teeth. With such a tool a clean, shearing cut is obtained. In addition a spiral bevel shaving tool of the character described has the further advantage that, due to the longitudinal inclination of the teeth, there is an overlap between the teeth of a spiral bevel shaving gear and a spiral bevel gear which is being shaved. This overlap means that a plurality of teeth of tool and gear are in mesh at all times as tool and gear rotate together and hence a controlled, uniform cutting action is obtained.

The lines of contact between a pair of spiral bevel gears extend in different directions on the two sides of the gear teeth. In some instances, therefore, I have found it desirable to have the cutting edges on one side of the teeth of a spiral bevel shaving gear extend in a somewhat different direction from the cutting edges on the other side of the teeth. This is not necessary, in all cases, however, and other expedients may be adopted to compensate for this difference in the inclination of the lines of contact, as will be described more fully hereinafter.

Where very rapid cutting action is desired, the teeth of the shaving gear may not only be grooved but gashed transversely. This has the additional virtue of reducing the amount of pressure required to effect the shaving operation.

The invention is not restricted to the shaving of spiral bevel gears, for, as will hereinafter appear, the principles of the invention may be applied to the shaving of other forms of bevel gears, to the shaving of hypoid gears and to the shaving of various forms of spur gears.

A further feature of the invention is the provision of an improved form of tool for burnishing bevel and hypoid gears. Heretofore, no practical form of tool has existed for the burnishing of hypoid gears and such forms of tools as were provided for burnishing bevel and hypoid gears have been simply other bevel or hypoid gears, having, in some instances, tooth surfaces roughened to extend the period of their usefulness for burnishing purposes. Due to the relative sliding, however, such hypoid burnishing gears smooth up very rapidly and even a bevel burnishing gear is only good to burnish a few gears. Its tooth surfaces either become too smooth also or become deformed due to greater wear above and below the pitch line than at the pitch line. I have found that a gear whose teeth are cross-gashed but not grooved on its side faces is an efficient burnishing tool and has an extremely long life.

Figure 4:
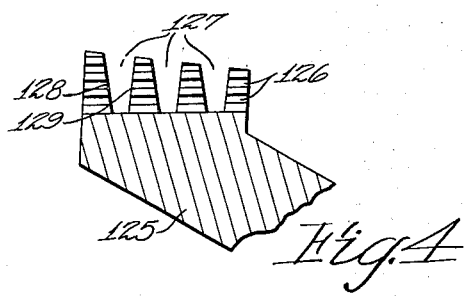
Fig. 4 is a fragmentary axial section of a modified form of tool.
Figure 18:
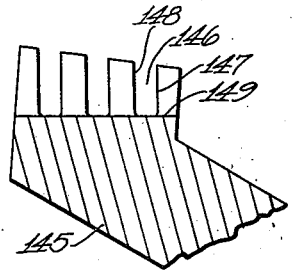
Figure 19:
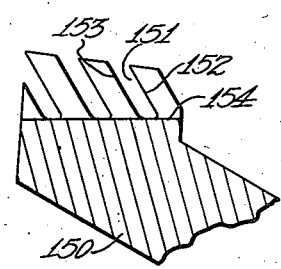
Figure 20:
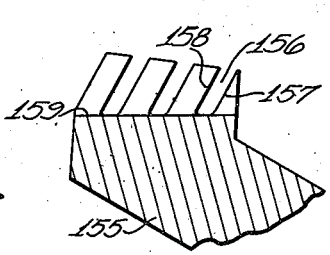
Figure 21:
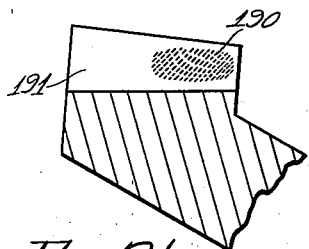
Figure 22:
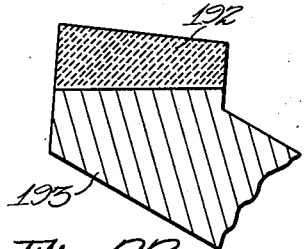
Figure 23:
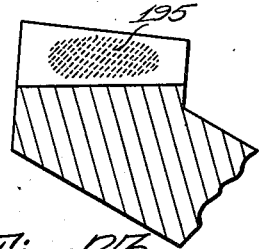
Figure 24:
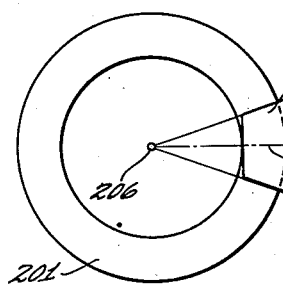
Figure 25:
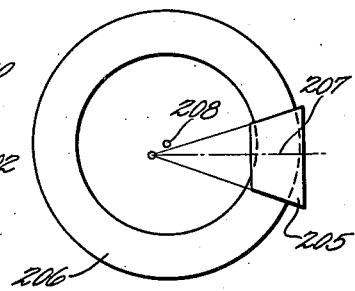
Figure 26:
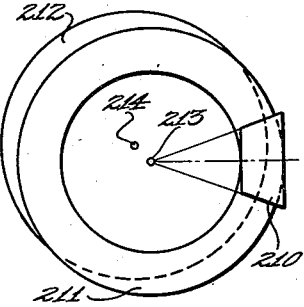
Figure 27:
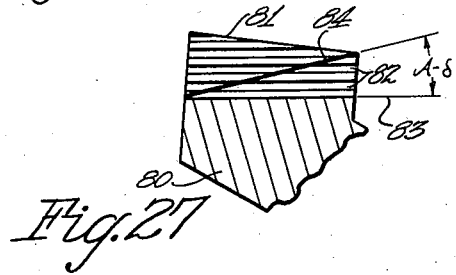
Figure 28:
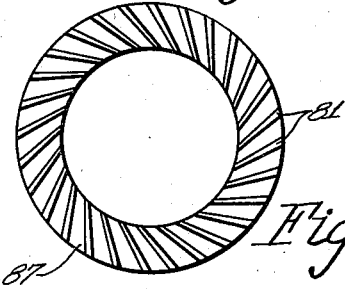
Figure 29:
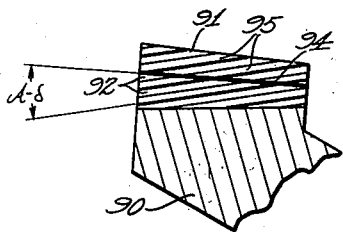
Figure 30:
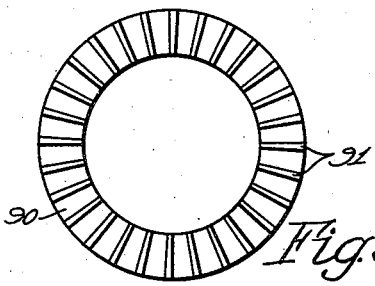

Figs. 14 to 17 inclusive are fragmentary sections taken transversely through a tooth of a tool and showing four different ways of forming the grooves in the side surfaces of teeth of shaving gears;

Figs. 18 to 20 inclusive are fragmentary axial sectional views showing various ways of transversely gashing the teeth of shaving or burnishing tools constructed according to this invention;

Fig. 21 is a fragmentary axial sectional view showing a typical tooth bearing of a pair of automotive drive gears;

Fig. 22 is a fragmentary axial section showing by way of contrast, the tooth bearing between a tool gear and the pinion being shaved, when the tool gear is constructed according to one embodiment of this invention;

Fig. 23 shows the tooth bearing between the tool gear and the pinion being shaved, when the tool gear is constructed according to another modification of this invention;

Fig. 24 is a view illustrating diagrammatically the method of shaving a bevel pinion with a tool gear constructed, as in Fig. 22, to have a full length tooth bearing;

Fig. 25 is a view illustrating diagrammatically the method of shaving a hypoid pinion when the tool gear has a full length tooth bearing such as shown in Fig. 22;

Fig. 26 is a view illustrating diagrammatically the method of shaving a bevel pinion when a tool gear having a localized tooth bearing of the form shown in Fig. 23 is employed as the shaving tool;

Figs. 27 and 28 are a fragmentary axial section and a plan view, respectively, of a tool gear of skew bevel form and illustrating diagrammatically the preferred relationship between the cutting edges of such tools and the lines of contact of the tool on the drive side of the teeth of the tool;

Figs. 29 and 30 are a fragmentary axial section and a plan view, respectively, of a shaving tool of straight bevel gear form and illustrating the preferred relationship between the cutting edges and the lines of contact on the drive side of the teeth of such gear;

Fig. 31 is a fragmentary perspective view of a further modification of shaving tool constructed according to this invention;

Fig. 32 is a fragmentary perspective view of a modification of this invention, showing a tool for the shaving of hypoid pinions; and Figs. 33 and 34 are diagrammatic views illustrating the relationship required between the grooves and the gashes in the form of tool shown in Fig. 4 in order to have the cutting edges of such a tool shave the whole of the tooth surface of a gear.

Figure 1:
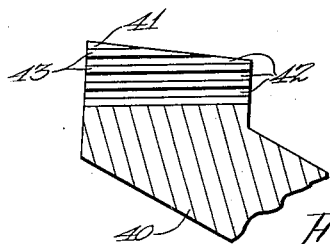
Fig. 1 is a fragmentary axial section and Fig. 2 a fragmentary plan view of a spiral bevel shaving gear constructed according to one embodiment of this invention.
Figure 2:
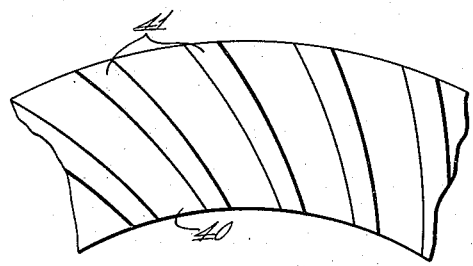
Figure 3:
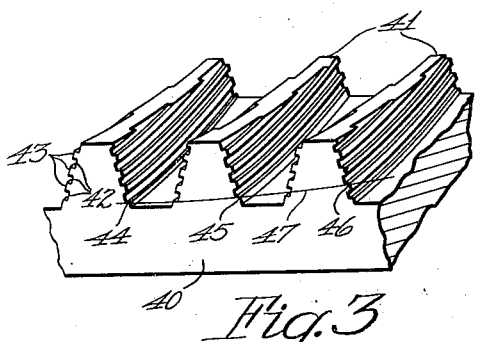
Fig. 3 is a fragmentary perspective view of this tool.

In Figures 1 to 3 inclusive, 40 designates a shaving tool suitable for shaving spiral bevel pinions. This tool is made by grooving the side surfaces of a spiral bevel gear whose teeth are curved longitudinally along circular arcs in development and have side surfaces of straight profile. This tool may be formed, in other words, from a standard spiral bevel gear of non-generated form having side tooth surfaces which are of straight profile and are conical surfaces of revolution.

In the embodiment shown, the grooves 42 are made parallel to the root lines of the teeth of the gear on both sides of the teeth. The lands 43 left between the grooves lie in the original surface of the gear from which the tool is formed and the lands are, therefore, of straight profile and are parts of conical surfaces of revolution.

In the preferred embodiment of the invention, grooves and lands, respectively, are displaced with reference to one another on successive teeth of the tool so that the cutting edges will be displaced with reference to one another on different teeth of the tool. Thus, the effect of a great number of cutting edges will be obtained and a smoother surface finish will be secured preferably, the lands and grooves are displaced spirally with reference to one another around the teeth of the gear. Such an arrangement is shown in Fig. 3 where the cutting edges 44, 45 and 46 of successive teeth of the tool 40 are shown arranged on a spiral 47. The lead of the spiral and the number of spirals around the gear are determined by the form and character of the shaving gear and also by the quality of finish desired on the pinion to be shaved.

As indicated above, it has heretofore been considered necessary to have relative lengthwise sliding between the cutting edges of a shaving tool and the tooth surfaces of the gear or pinion being shaved in order to have effective shaving action. Heretofore then, it has been supposed that it was necessary to employ a tool of hypoid gear form in order to shave a bevel gear and to mesh that tool with the gear to be shaved in offset relation. I have found that it is entirely practical to shave bevel gears with a tool of bevel gear form such as shown in Figs. 1 to 3 inclusive. This discovery is predicated, as already stated, upon the theory that in order to effect smooth, efficient cutting action, the direction of the cutting edges of the shaving tool must be related to the direction of the lines of contact between the teeth of the cutting tool and the tooth surfaces of the gear being shaved.

Figure 8:
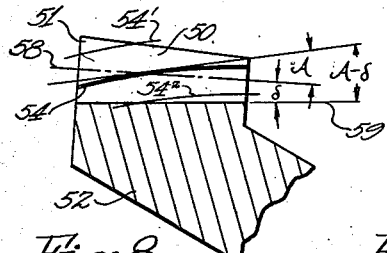
Figs. 8 and 9 are fragmentary axial sectional views illustrating diagrammatically the relationship between the lines of contact and the cutting edges on the drive side of the teeth of the tool in Figs. 1 to 3 inclusive.
Figure 11:
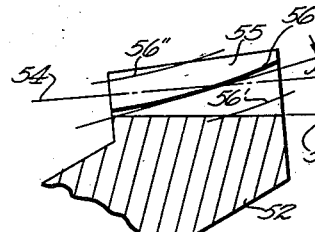
Figs. 11 and 12 are fragmentary axial sectional views illustrating diagrammatically the relation of the lines of contact to the cutting edges on the coast side of the teeth of a shaving gear when the cutting edges are parallel to the root plane of the tool.

When a pair of spiral bevel gears rotate in mesh, the mating tooth surfaces of the pair contact along lines which are curved and which extend diagonally across the tooth surfaces of the gear. For the drive side of the teeth these lines extend in one direction and for the coast side of the teeth they extend in the opposite direction. Thus, as shown in Fig. 8, the line of contact of the drive side of the tooth 51 of a spiral bevel gear 52 with the tooth surface of a mating pinion will, for one instant of mesh, extend along the curved line 54. For the coast side 55 of this same tooth of the gear 52, the line of contact, at the same instant, will be a curved line 56 such as shown in Fig. 11. As the gear and its mate roll together these lines of contact will move across the tooth surfaces of the gear from top to bottom thereof. Thus, other positions of the lines of contact for other positions of mesh of gear and pinion are indicated at 54' and 54'' in Fig. 8 and 56' and 56'' in Fig. 11.

Now, to obtain satisfactory smooth, cutting action, the cutting edges of the shaving tool must be properly inclined to these lines of contact. I have found that on a spiral bevel shaving gear, the cutting edges may have the same inclination to the lines of contact as the root lines of the teeth have to the lines of contact and correct cutting action may then be obtained.

It will be noted, however, from Fig. 8 that, measured at the center of the tooth, the lines of contact are inclined at some angle A to the pitch line 58 of the gear tooth and it will be noted from Fig. 11 that the line of contact 56 has the same inclination A to the pitch surface 58 but that measured with reference to the root surface 59 of the teeth, the lines of contact 54 and 56 have different inclinations. Thus, on the drive side of the teeth, the lines of contact are inclined at an angle A—d to the root line 59, where d is the dedendum angle of the teeth, while on the coast side the lines of contact 56 are inclined to the root surface 59 at an angle A+d.

Figure 9:
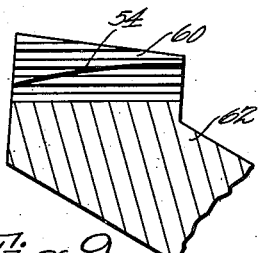
Figure 12:
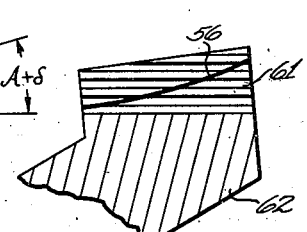

For most automotive jobs, I have found that this difference in inclination of the lines of contact to the root surface on the opposite sides of the gear teeth is not great and can be disregarded and that when grooves 60 and 61, respectively, are provided in the opposite sides of the teeth of a spiral bevel shaving gear 62 which are parallel to the root lines of the teeth of such gear, as shown in Figs. 9 and 12, a satisfactory, shearing, cutting action is obtained. The angle between the cutting edges and the lines of contact may vary. I have found the angle may vary from 3° to 15° or more and when the grooves are made parallel to the root lines on both sides of the teeth of the shaving tool, it very materially simplifies the production of the tool. The only noticeable effect of so grooving the shaving tool is that in some instances the shaving action may proceed slightly faster on the coast side than on the drive side of the teeth.

Figure 13:
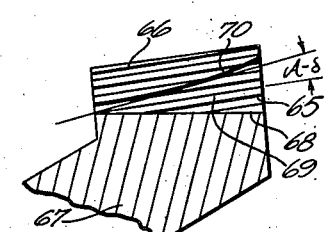
Fig. 13 is a fragmentary axial sectional view showing diagrammatically the relation between the lines of contact and the cutting edges on the coast side of a tooth of a modified form of tool.

In those instances where it is desired that the shaving action proceed at the same rate on both sides of the teeth, the grooves on the coast side of the teeth of the shaving gear may have the same inclination to the lines of contact on this side of the tooth of the tool as the cutting edges on the drive side of the teeth have to the lines of contact for that side of the teeth. This arrangement is shown in Fig. 13. Here the grooves 65 in the surface of the coast side 66 of a tooth of a shaving gear 67 are shown inclined to the root surface 68 of the gear at such an angle that the cutting edges 69 formed by these grooves make an angle A—d with the lines of contact 70 for this side of the teeth. This angle A—d is equal to the angle of inclination of the cutting edges on the drive side of the teeth to the lines of contact for that side of the teeth.

Figure 10:
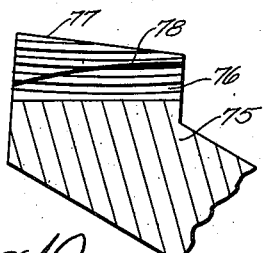
Fig. 10 is a fragmentary axial section of a tool built according to a still further modification of this invention and showing diagrammatically the relationship between the lines of contact and the cutting edges on the drive side of the teeth of this tool.

In the various modifications of the invention heretofore described, the grooves and the cutting edges of the shaving tools are shown as straight. They may, however, be curved longitudinally as shown in Fig. 10. Here a shaving gear 75 is shown having cutting edges formed by circular arcuate grooves 76 in the sides of its teeth 77. In the embodiment of the invention shown in Fig. 10, the cutting edges formed by the grooves 76 have the same inclination to the lines of contact 78 for the drive side of the teeth of the gear 75 as have the cutting edges of the drive side of the teeth of the gear 62, as shown in Fig. 9, to the lines of contact 54 of that tool.

Up to this point, we have spoken specifically only of tools for the shaving of spiral bevel gears and pinions. The invention is applicable, however, to the shaving of all types of gears and the relationship, which we have discovered between the directions of the lines of contact and the cutting edges must be observed for a shaving gear of any form if smooth, efficient cutting action is to be obtained.

For skew bevel gears, the lines of contact are straight, but are inclined to the pitch and root lines on opposite sides of the gear teeth at the same angle as in spiral bevel gears of the same size. In Figs. 27 and 28, 80 designates a tool of skew bevel gear form whose teeth 81 have tooth surfaces grooved as indicated at 82 in directions parallel to the root line 83 of the teeth. This tool gear is of the same size as the spiral bevel tool gear 62 shown in Fig. 9. Hence, while its lines of contact 84 are straight, they will have the same inclination A—d to the root line 83 of the teeth as have the lines of contact 54 of the gear 62. The drive side only of the skew bevel tool gear is shown in Fig. 27. The grooves in the coast side of the teeth of this gear may also be made parallel to the root line of the teeth similar to the tool shown in Fig. 12 or they may be inclined to the root line so that the cutting edges will have the same inclination to the lines of contact on the coast side of the teeth as on the drive side, corresponding therefore to the spiral bevel gear tool shown in Fig. 13.

For straight bevel gears, the lines of contact are straight and extend to the pitch cone apex. A straight bevel shaving gear 90 is shown in Figs. 29 and 30. The lines of contact between the teeth of such a tool and the tooth surfaces of a straight bevel gear or pinion being shaved are straight lines which run to the gear apex of the tool. One of such lines is denoted at 94 in Fig. 29.

To obtain efficient, smooth cutting action, the cutting edges of the tool gear 90 should be inclined to the lines of contact 94 at approximately the same angle as between cutting edges and lines of contact for spiral bevel gears. This means that the teeth 91 of the shaving gear 90 should be grooved in somewhat the fashion indicated at 92 in Fig. 29 so as to obtain cutting edges inclined to the lines of contact 94 at substantially an angle A—d equal to the angles A—d previously described.

Since straight bevel gears contact along the whole length of their tooth surfaces simultaneously and since portions of the tooth surfaces of a straight bevel shaving tool are necessarily cut away to provide the cutting edges, it is desirable that, where a straight bevel shaving gear is employed, some means be provided to maintain correct timed rotation of the tool and the gear to be shaved, as they roll together. Such means may comprise a train of gearing, positively driving the tool and gear spindle in the timed relation corresponding to the ratio of a number of teeth of the tool gear and the gear to be shaved.

Fig. 32 shows a form of tool gear suitable for shaving hypoid pinions. It is desirable to have the lines of contact between the teeth of such a tool gear and the hypoid pinion which is to be shaved extend in substantially the same direction as the lines of contact between spiral bevel gears. With such a form of tool, the grooves on opposite sides of the teeth can be made parallel to the root line of the teeth and still leave the same angle between the cutting edges and the lines of contact as occur in the case of a spiral bevel shaving tool. To obtain the desired direction of the lines of contact, it is necessary, because of the offset relation of hypoid gears, to reduce the pressure angle on the drive side of the teeth of a hypoid shaving gear and increase it on the coast side, as compared with the pressure angles of a spiral bevel gear. Thus, in the case of the hypoid shaving gear shown in Fig. 32 the pressure angle $a$ of the drive side 100 of the teeth 101 is considerably less than the pressure angle $a'$ of the coast side 102 of the tooth. This contrasts with the spiral bevel gear shaving tool shown in Fig. 31. In this latter form of tool, the included angle between the opposite sides of a tooth 105 is the same as the included angle between opposite sides of the tooth 101 but the pressure angles $a''$ of the two sides of the tooth 105 of the bevel gear shaving tool are equal.

With the hypoid tool constructed as shown in Fig. 32, the line of contact 104 for the drive side of the teeth extends substantially in the same direction as a line of contact 54 of the spiral bevel shaving gear shown in Fig. 9 and the lines of contact on the coast sides of the teeth will extend substantially in the same direction as the lines of contact 56 of the coast side of this spiral bevel shaving tool.

Figure 14:
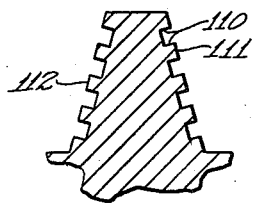
Figure 15:
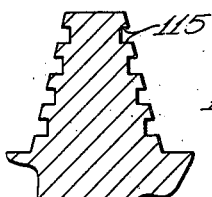
Figure 16:
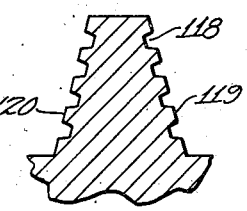
Figure 17:
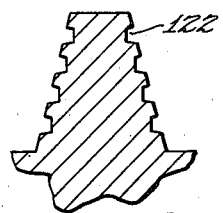

Various ways in which the grooves may be cut into the teeth of shaving tools are shown in Figs. 14 to 17 inclusive. Fig. 14 shows a shaving gear in which the grooves have parallel sides 110 and are cut into the sides 111 and 112 of the teeth at right angles to these sides. Fig. 15 shows a tool in which the grooves have straight sides 115 that are cut into the sides of the teeth in such way that these sides of the grooves are parallel to either the root or top line of the teeth. Fig. 16 shows a tool having V-shaped grooves 118 which are cut into the sides of the teeth at right angles to the sides 119 and 120 of the teeth. Fig. 17 shows a tool having V-shaped grooves 122 cut into the teeth in directions parallel to the root or the top line of the teeth.

Where quite rapid cutting action is desired, the shaving tools may be cross-gashed in addition to being grooved, as shown in Fig. 4. Here a shaving tool 125 is shown which has its teeth grooved, as indicated at 126, to provide longitudinal cutting edges, parallel to the root lines of the teeth, and which has the teeth also gashed transversely as indicated at 127 to provide profile cutting edges 128 and 129. The gashes 127 extend entirely through the teeth, and are, in the form shown, of V-shape so that the cutting edges 128 and 129 are slightly inclined to the pitch surface of the tool.

The cross-gashes may take various forms. In

Figure 5:
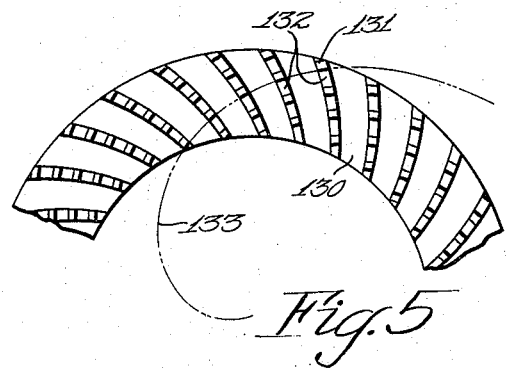
Figs. 5, 6 and 7 are fragmentary plan views of shaving gears, illustrating, respectively, three different ways of transversely gashing the teeth of the tool shown in Fig. 4.
Figure 6:
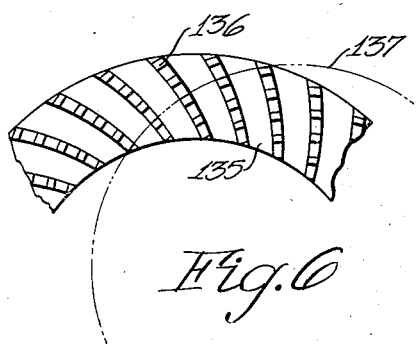
Figure 7:
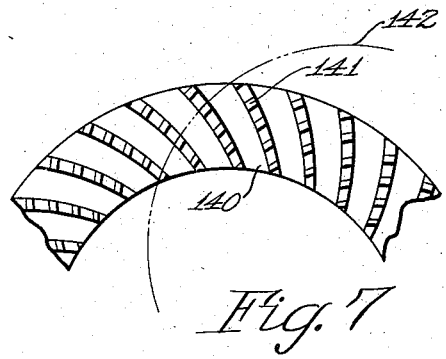

Fig. 5 a spiral bevel shaving gear 130 is shown whose teeth 131 has cross gashes 132 extending along spirals 133 which intersect the teeth 131 substantially at right angles. In Fig. 6, a spiral bevel shaving gear is shown whose teeth 136 are gashed transversely along circular arcs 137 which extend at right angles to the teeth. In Fig. 7 a spiral bevel shaving gear 140 is shown whose teeth 141 are gashed transversely along circular arcs 142 which intersect the concave sides of the gear teeth at an acute angle and the convex sides of the tooth at an obtuse angle. Other arrangements of cross gashes will occur to those skilled in the art.

The modifications shown in Figs. 6 and 7 have the advantage that the tools may be cross-gashed with face-mill cutters similar to the cutters used to cut the teeth of these tools originally. In all of the embodiments of the invention shown in Figs. 5 to 7 inclusive the cross-gashes intersect the different teeth of the gear in such way that the profile cutting edges formed by the cross-gashes are displaced relative to one another longitudinally along successive teeth of the gear. When the tool has longitudinal cutting edges displaced relative to one another on the profiles of different teeth and has also transverse cutting edges displaced relatively lengthwise of the different teeth, the effect is as of a tool having a practically infinite number of longitudinal cutting edges and a practically infinite number of transverse cutting edges and hence very smooth cutting will result.

The cross-gashes may have sides inclined in various different ways to the pitch or root lines of the teeth. In Fig. 4, the cross gashes are of V-shape. Fig. 18 shows a tool gear 145 having cross-gashes 146, the sides 147 and 148 of which are parallel and perpendicular to the root line 149 of the teeth. Fig. 19 shows a tool gear 150 having cross gashes 151 whose sides 152 and 153 are parallel but incline rearwardly with reference to the root line 154 of the teeth. Fig. 20 shows a tool 155 whose teeth are cross-gashed by gashes 156 whose sides 157 and 158 are parallel but incline forwardly with reference to the root line 159 of the teeth. Still other forms of gashes will suggest themselves to those skilled in the art.

Where the teeth of the shaving tools are both grooved and gashed, mere displacement of the grooves on different teeth is not sufficient to insure complete coverage and complete cutting of the tooth surfaces of the gear or pinion being shaved. The grooves must be displaced according to a definite law as will now be described.

Fig. 33 is a more or less diagrammatic side elevation of a tooth of a shaving gear. This tooth is provided with longitudinal grooves 160 extending parallel to the root line 163 of the tooth. Between the grooves 160 are lands 161 whose side edges 162 form longitudinal cutting edges of the tool. The tooth is also gashed transversely by V-shaped gashes 164 which form profile cutting edges 165 and 166.

In the tool illustrated in the Fig. 33, the grooves 160 and lands 161 are arranged on a spiral which has a lead equal to the pitch of the grooves so that the grooves are displaced on successive teeth of the gear a distance equal to the pitch of the grooves divided by the number of teeth in the gear.

With this construction, the bottom right hand corners of the lands 161 of the tool lie on the helical line 167 and corresponding corners of the lands next highest on the profile of the teeth lie in a helical line 168. The diagonally opposite corners of these two series of lands lie on the lines 169 and 170, respectively. From the Fig. 33, it will be noted that the lines 169 and 168 diverge toward the right hand or large end of the tooth. In other words there is a space between the lines 168 and 169 where there are no cutting edges and hence where there would be no shaving action. If the grooves were arranged on a shaving tool, then, in the manner shown in Fig. 33, the gear being operated upon would not be completely shaved.

If the grooves are arranged, however, as shown in Fig. 34 the shaving action will be complete. Here the lead of the spirals on which the grooves and lands are arranged, is equal to twice the pitch of the grooves. Thus the lower right hand corners of one series of lands 172 are arranged on a helix 173 and the corresponding corners of the next higher series of lands lie in a helix 175. The diagonally opposite left hand upper corners of these two series of lands lie in helices 176 and 177, respectively. It will be noted that the helix 175 completely overlaps the helix 176. Hence, the cutting edges of the shaving tool will completely cover the tooth surfaces of the gear to be shaved and completely shave the same. Complete coverage of the tooth surfaces of the gear can be obtained, then, by displacing the gashes from tooth to tooth on the shaving gear a distance equal to the pitch of the gashes divided by the number of teeth in the gear and by displacing the grooves a distance equal to twice the pitch of the grooves divided by the number of teeth in the gear or still more broadly by displacing the grooves from tooth to tooth a distance equal to a multiple of the pitch of the grooves divided by the number of teeth in the shaving gear.

As has already been stated, heretofore no satisfactory form of tool has been devised for burnishing hypoid gears. Due to the sliding action, the tooth surfaces of gears used as burnishing tools have smoothed up too fast. We have found that where no correcting action is necessary but is only required to burnish the tooth surfaces, an eminently satisfactory form of burnishing tool can be provided simply by cross-gashing the tooth surfaces of a gear in a manner similar to that shown in Figs. 4, 18, 19 and 20. In this case, the longitudinal grooves are omitted and the tooth surfaces of the burnishing tools are smooth except for the cross gashes. They are like the tooth surfaces shown in Figs. 18 to 20 inclusive. Hypoid gears whose teeth are cross gashed this way have an extremely long life as burnishing tools and the life of spiral bevel gear burnishing tools is also very materially increased by cross gashing. The cross-gashes should be of such form that they intersect successive teeth at points displaced with reference to one another along the length of the teeth.

In the forms of the invention which have been heretofore referred to, the grooves and lands have been of equal widths and, moreover, of the same dimensions on both sides of the teeth of the shaving gears. The grooves and lands may, however, be of different widths. The narrower the lands the smaller the unit pressure required to shave and the faster the shaving action under a given pressure.

In some instances, also, it may be desirable to have the lands of different widths on the opposite sides of the teeth of the shaving gear. Thus, for instance, if the shaving action were too rapid on the coast side of the teeth as compared with the drive side, the action might be equalized by making the lands wider on the coast side of the teeth than the drive side. Such a construction is illustrated in Fig. 31. Here the tooth lands 180 for the coast side of the tooth 105 of the shaving gear are wider than the lands 182 of the drive side of the teeth.

In all forms of my invention, the shaving tool is made from a gear which is quite similar in form to the mate gear of the gear to be shaved. Certain differences between the tool gear and the mate gear have already been pointed out. Besides these, the teeth of the tool gear are ordinarily made of greater chordal thickness than the teeth of the mate gear so that the tool gear will run with the gear to be shaved without any backlash and cut simultaneously on both sides of the tooth spaces of the gear being shaved. A still greater distinction between the tool gear and the mate gear is to be found in the form of bearing produced on the tool gear.

Fig. 21 shows a typical tooth bearing of a spiral bevel or hypoid gear forming one member of an automotive drive. The radii of curvature of the mating tooth surfaces of a pair of automotive drive gears are selected so that they mismatch and so that when the pair of gears are meshed in correct position without load, the bearing or tooth contact is concentrated at the small ends of the gear teeth as indicated by the shaded portion 190 of the tooth 191 shown in Fig. 21.

The teeth of a shaving gear for use according to the principles of the present invention may be cut according to one of two different methods. The tooth surfaces of the shaving gear are cut either to radii that match the radii of the tooth surfaces of the pinion to be shaved so that the teeth of the shaving gear will have full length tooth contact with the tooth surfaces of the gear to be shaved, as shown in Fig. 22, or the tooth surfaces of the shaving gear are cut on radii that mismatch the radii of the tooth surfaces of the pinion to be shaved but from centers such that contact of the teeth of the shaving gear with the tooth surfaces of the gear to be shaved will be localized at the center of the tooth surfaces.

Fig. 22 illustrates diagrammatically a shaving gear cut according to the first method. Here the shaving gear 193 is cut with tooth surfaces whose radii match exactly the radii of the meshing tooth surfaces of the gear to be shaved. Hence the teeth of the shaving gear 193 will have full length bearing contact 192 with the tooth surface of the gear to be shaved. Fig. 23 illustrates diagrammatically a shaving gear cut according to the second method. Here, the tooth surfaces of the shaving gear are cut to be tangent to the meshing tooth surfaces of the gear to be shaved at points midway the length of the tooth surfaces and the tooth bearing, as indicated 195, will be localized midway the length of the tooth surfaces. In both forms of the invention, some slight change in pressure angle of the cutters employed in cutting the shaving gear as compared with the pressure angles of the cutter employed to cut a mate gear may also be required in order to avoid bias bearing.

When a tool such as shown in Fig. 22 is employed for shaving spiral bevel or hypoid gears, the shaving gear and the gear to be shaved are run together on fixed centers without any motion other than a feed motion in the direction of tooth depth. Thus, as shown in Fig. 24, when a bevel pinion 200 is to be shaved with a bevel shaving gear 201 constructed according to the method illustrated in Fig. 22, the pinion and shaving gear will be meshed like an ordinary pair of bevel gears with the axis 202 of the pinion intersecting the axis 203 of the shaving gear and the pinion and shaving gear will be rotated together on their axes while a relative depthwise feed movement is produced between them. Either gear or pinion may act as the driver.

Likewise, when a hypoid pinion 205 is to be shaved with a hypoid shaving gear 206 whose teeth are cut to have a full length tooth bearing with the pinion tooth surfaces, the pinion and gear will be meshed on fixed centers with the axis 207 of the pinion offset from the axis 208 of the gear a distance equal to the offset between the axis of the pinion and its mate gear when in mesh. For shaving the pinion 205, the pinion and the tool gear 206 are rotated in mesh upon their respective axes and a simple feed movement in the depthwise direction of the teeth produced.

Where the tool gear, whether it be a bevel or a hypoid tool gear, is constructed as shown in Fig. 23 to have a localized tooth bearing when run with the gear to be shaved, then it is necessary to produce a motion lengthwise of the teeth of the shaving gear, in addition to the rotary motions of tool and gear, in order to shave the full length of the teeth of the gear. For this purpose the shaving operation may be effected on a machine such as described in the patent to Slade, No. 1,796,484 of March 17, 1931. The method of operation of this machine is illustrated diagrammatically in Fig. 26. 210 denotes the spiral bevel pinion to be shaved and 211 is the spiral bevel shaving gear. The gear is secured to a spindle which is mounted eccentrically in an oscillatable carrier 212. Thus the axis 213 of the shaving gear is offset from the axis 214 of the carrier. The pinion may act as the driver, and as the pinion and shaving gear rotate in mesh, the carrier 212 is oscillated to move the tooth bearing or contact of the shaving gear from one end of the pinion to the other thereby shaving the whole length of the tooth surfaces of the pinion. A relative depthwise feed movement may be produced manually between the shaving gear and pinion during rotation and oscillation, or the tool and pinion may be forced into depth under spring pressure.

For the shaving of the spur gears, a tool constructed according to the principles of this invention will have its cutting edges extending longitudinally of its teeth but inclined to the pitch and root lines of the teeth in accordance with the principles above set forth with reference to bevel and hypoid gears. A tool for shaving helical gears may have its cutting edges extending parallel to the root and pitch lines of its teeth for the teeth of helical gears contact along lines inclined to the pitch and root lines of the teeth. For both spur and helical gears ordinarily the teeth of the shaving tools will be cut to have a full length bearing with the tooth surfaces of the gear to be cut and shaving gear and gear to be cut will simply be rotated together with such additional depthwise feed movement as may be required to shave the tooth surfaces to full depth. The shaving gear, however, may be made to have a localized tooth bearing but in such case an added relative motion lengthwise of the teeth will have to be imparted between tool and gear to be shaved to shave the tooth surfaces of the gear for their full length.

While the invention has been described in connection with the use of shaving tools formed from non-generated gears, it will be apparent that the principles of the invention apply also where the tools are made from generated gears. In general, it may be said that while several different embodiments of the invention have been illustrated and described, the invention is capable of still further modification and this application is intended to cover any adaptations, uses or embodiments of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. A tool of rotary gear form having its teeth gashed through transversely at spaced intervals along their lengths and having a plurality of grooves formed longitudinally in the sides of each of its teeth so that burnishing lands are left between said grooves, the bounding edges of said gashes and the bounding edges of said grooves constituting cutting edges, said gashes being displaced longitudinally relative to one another on successive teeth and said grooves being displaced relative to one another along the profiles of successive teeth and being arranged in a spiral which has a lead which is a multiple of the pitch of the grooves.

2. A tool of tapered gear form having a pitch surface inclined at other than 180° to its axis and having teeth which are longitudinally inclined to the elements of said pitch surface, each of said teeth having a plurality of grooves formed in its sides to leave burnishing lands between said grooves, the bounding edges of said grooves constituting cutting edges, said grooves and lands extending longitudinally of the teeth, and the grooves and lands on one side of all of the teeth, at least, being parallel to the root lines of the teeth.

3. A shaving tool of rotary gear form having teeth which are longitudinally inclined to the elements of its pitch surface, each of said teeth having a plurality of grooves formed in its sides to leave burnishing lands between said grooves, the bounding edges of said grooves constituting cutting edges, said grooves and lands extending longitudinally of the teeth and being inclined on both sides of the teeth to the lines of contact between said teeth and the teeth of the gear which is to be shaved, and on one side of all the teeth, at least, extending parallel to the root lines of the teeth, said grooves and lands being progressively displaced relative to one another along the corresponding profiles of successive teeth, the lands on one side of the teeth being of different width from the lands on the opposite sides of the teeth.

4. A tool of tapered gear form having its pitch surface inclined at other than 180° to its axis and having longitudinally curved teeth whose sides are conical and which are provided with a plurality of spaced grooves which extend longitudinally of the teeth and are inclined on both sides of the teeth to the tops of said teeth and are displaced progressively relative to one another on the corresponding sides of successive teeth, the bounding edges of said grooves constituting cutting edges and the lands left between said grooves constituting burnishing surfaces.

5. A shaving tool of tapered gear form having its pitch surface inclined at other than 180° to its axis and having longitudinally curved teeth whose sides are conical and are formed with a plurality of spaced grooves which extend longitudinally of the teeth and are inclined on both sides of the teeth to the tops of said teeth and which are displaced progressively relative to one another along the corresponding profiles of successive teeth, said grooves extending parallel to the root lines of the teeth on at least one side of all the teeth, the bounding edges of said grooves constituting cutting edges and the lands left between said grooves constituting burnishing surfaces.

6. A shaving tool of tapered gear form having its pitch surface inclined at other than 180° to its axis, said tool having longitudinally curved teeth and having the sides of its teeth formed with spaced grooves which extend longitudinally of the teeth and are inclined on both sides of each tooth to the top and pitch lines of the tooth and to the lines of contact between the sides of the teeth and the sides of the gear to be shaved, the bounding edges of said grooves constituting cutting edges and the lands between said grooves constituting burnishing surfaces.

7. A shaving tool of tapered gear form having its pitch surface inclined at other than 180° to its axis and having longitudinally curved teeth whose sides are conical and have different radii of curvature from the radii of curvature of the tooth surfaces of the gear to be shaved, said tool having the sides of its teeth formed with spaced grooves which extend longitudinally of the teeth, the grooves on one side of all the teeth, at least, being parallel to the root lines of the teeth, and the grooves being displaced progressively relative to one another along the corresponding profiles of successive teeth, the bounding edges of said grooves constituting cutting edges and the lands between said grooves constituting burnishing surfaces.

8. A shaving tool of tapered gear form having its pitch surface inclined at other than 180° to its axis and having teeth which extend radially of its apex whose side surfaces are formed with a plurality of spaced grooves that extend longitudinally of the teeth and are inclined to the top, pitch, and root lines of the teeth on both sides of all the teeth.

9. A shaving tool of tapered gear form having longitudinally curved teeth and having alternate grooves and lands formed on both sides of its teeth that extend longitudinally of the teeth parallel to the root lines of the teeth, the intersections of the sides of the grooves with the lands constituting cutting edges, and the lands being wider on the coast side of the teeth than on the drive sides thereof.

10. A shaving tool of tapered gear form having longitudinally curved teeth whose drive sides have smaller pressure angles than the coast sides, said teeth being provided with alternate grooves and lands on both sides of the teeth which extend longitudinally of the teeth, the intersection of the sides of said grooves with the lands constituting cutting edges and said cutting edges having equal inclination on opposite sides of the teeth to the lines of contact between said teeth and the teeth of a gear to be shaved.

WINFRED A. WITHAM.